Nov. 30, 1926.
S. P. JOHNS
VEHICLE SIGNAL
Filed April 25, 1921
1,608,751
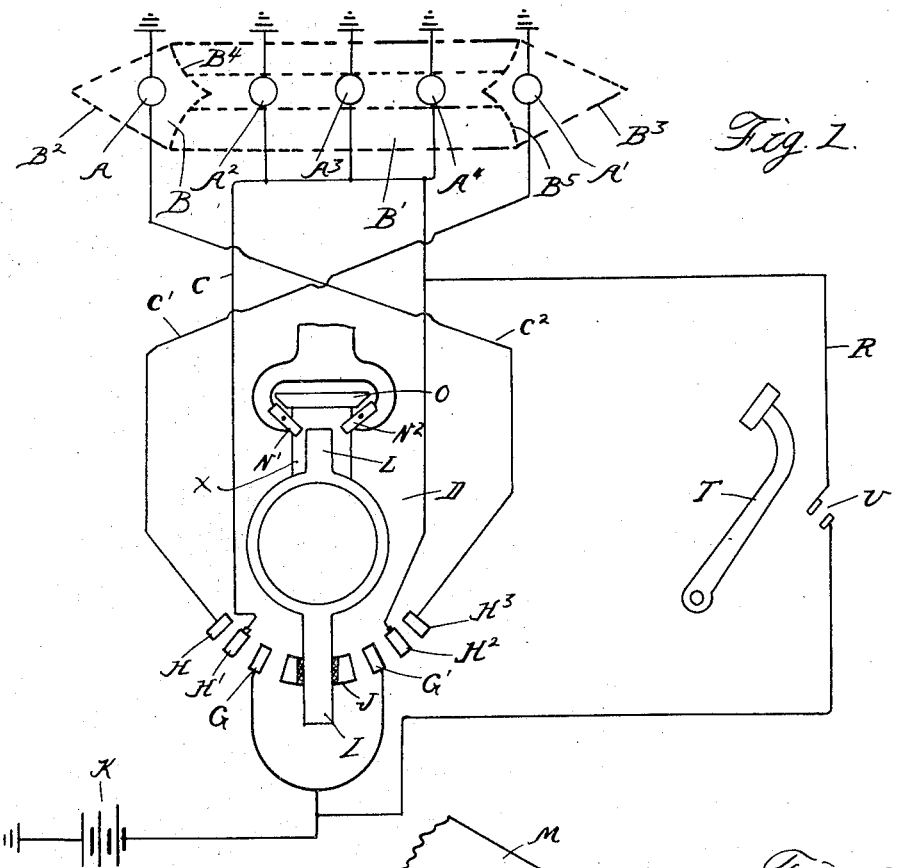
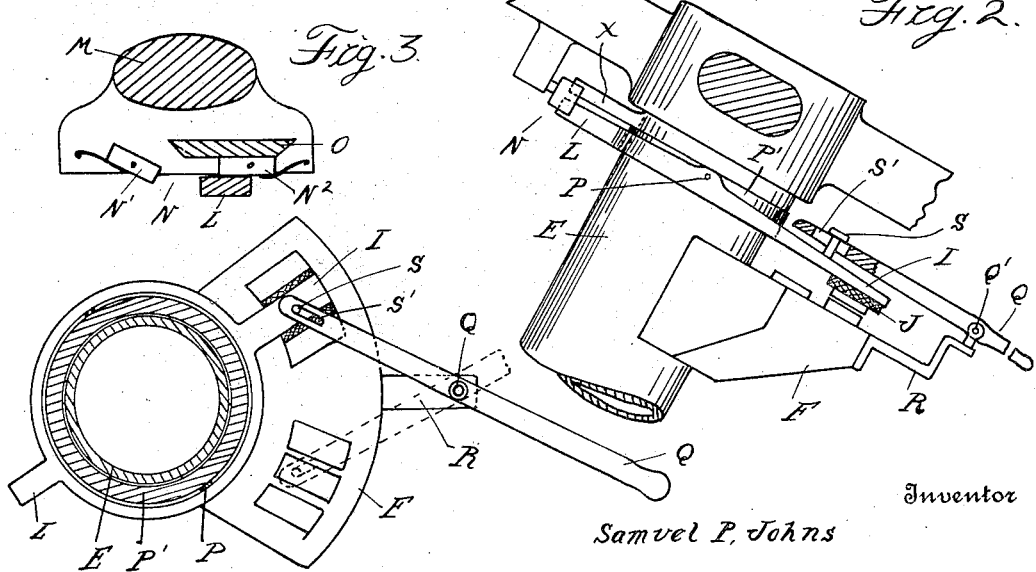
Inventor
Samuel P. Johns Patented Nov. 30, 1926.

1,608,751

UNITED STATES PATENT OFFICE.

SAMUEL P. JOHNS, OF HIGHLAND PARK, MICHIGAN.

VEHICLE SIGNAL.

Application filed April 25, 1921. Serial No. 464,189.

The invention relates to signals designed for use on vehicles and particularly motor vehicles for indicating a proposed change in direction.

It is one of the objects of the invention to provide means by which the indicator may be manually operated in advance of the action, such as turning either right or left, and will be automatically returned to normal by the completion of the turn or other action. It is a further object to obtain a construction applicable to any type of vehicle. To this end the invention consists in the construction as hereinafter set forth.

In the drawings:

Figure 1 is a diagrammatic view illustrating the signal and the manual and automatic controlling means therefor;

Figure 2 is an elevation of the steering post and a portion of the steering wheel of a vehicle, showing the signal controlling mechanism in relation thereto;

Figure 3 is a cross-section on line 3—3 of Figure 2;

Figure 4 is a plan view of the controlling switch.

The signal means which I employ with my improved apparatus is preferably electric and preferably consists of a series of electric lamps arranged in a housing with its front representing a double headed arrow. The end lamps of the series are arranged in the opposite heads of the arrow and the intermediate lamps are arranged between the heads in the stem or shaft portion of the arrow. Thus as shown, A and A' are the end lights and $A^2$, $A^3$, $A^4$ the intermediate lights, all being arranged in a housing B having a central compartment B' and end compartments $B^2$ and $B^3$. These end compartments are fashioned in the form of arrow heads and are separated from the intermediate compartment by partitions $B^4$ and $B^5$, preventing the light from passing from one compartment to another. The lamps $A^2$, $A^3$, $A^4$ are arranged in one electric circuit C, and the lamps A and A' in separate electric circuits C' and $C^2$, all of which are controlled from a single electric switch D. This switch is preferably mounted upon the steering post E of the motor vehicle, being provided with an insulator support F for a series of electric contacts G. G' and H, H', $H^2$ and $H^3$. I is a movable contact arm, preferably pivotally mounted upon the post E and carrying an insulated contact J, which may be adjusted to either right or left. When adjusted in one direction, the contact J will bridge between the contacts G', $H^2$ and $H^3$, while a corresponding adjustment in the opposite direction will bridge between the contacts H, H' and G. The contacts G and G' are connected with a line from the battery K, the opposite pole of which is grounded and the lamps A, A', $A^2$ etc. also have one terminal grounded. Thus, when the contact J is moved to the right to bridge between the contacts G', $H^2$, $H^3$, the lamps A', $A^4$, $A^3$, $A^2$ will all be energized, illuminating the arrow with its head pointing to the right. On the other hand, when the contact J is moved to the left bridging between the contacts H, H' and G, the lamps A, $A^2$, $A^3$ and $A^4$ will be energized, illuminating the arrow pointing to the left.

With the signal as thus far described, in operation, the driver may set the signal in advance indicating a turn to either right or left. To avoid continuing the signal after the turn is accomplished, I have provided means whereby the returning of the steering wheel to neutral position will extinguish the signal. This operation must, however, be performed only upon the return movement of the wheel and not upon the movement which effects the turning of the vehicle, as in the latter case the signal would be extinguished prematurely. This necessitates a mechanism permitting; first, the manual operation of the signal switch without interference by the steering wheel; second, the operation of the steering wheel to effect the turning without interference with the switch; and third, the actuation of the switch by the steering mechanism on the return movement thereof, which will extinguish the signal.

As shown, the switch D is provided with a projecting finger L. preferably arranged on the opposite side of the steering column from the handle I. M is the steering wheel revoluble upon the column E. N is a latch for coupling the finger L with the steering wheel and as shown comprising a pair of dogs N' and $N^2$ normally arranged on opposite sides of said finger when the parts are in neutral position. The dogs N' and $N^2$ are prevented from engaging with the finger L when the steering wheel is moved away from neutral position by means of a cam O, which is mounted upon a stationary stem X. The arrangement is such that in the initial movement of the steering wheel from neutral position, one or the other of the dogs N', N², according to the direction of turning, will engage with the cam O and will be withdrawn from the path of the finger L. On the other hand, if the finger L has been previously moved away from its neutral position, it will no longer be in such relation to the cam O as to effect such disengagement of the dog. Consequently, after the switch has been operated to display the signal, the movement of the steering wheel from neutral to effect the turning will adjust the dogs N', N² into a position for engagement with the finger L and the return movement of the steering wheel towards neutral will carry back with it said finger L and shift the switch D to neutral. After such return the steering wheel may be moved in either direction without imparting any movement to the switch which must be manually set to display the signal.

My construction has the advantage that it precludes the displaying of a false signal, as might easily happen where the driver having indicated the return, forgets to neutralize the switch. On the other hand, the setting of the switch must be manually performed and this permits the operator to effect the indication sufficiently in advance of the movement to warn others.

In manually setting the switch it is necessary to disengage the finger L from the dogs N' and N² and it is also desirable to set the switch by an actuating means which is moved in the same direction that the vehicle is to be turned. To accomplish this purpose I have provided an actuating lever Q upon the driver's side of the steering wheel, which is fulcrumed at Q' upon a bracket R secured to the support F. The inner end of the lever Q is attached to the movable contact arm I through the medium of a pin S passing through a slot S', the arrangement being such that when the actuating end of the lever Q is moved to the right, it will move the contact arm I correspondingly to the left. It is, however, necessary to first disengage the finger L from the dogs N' and N², which is accomplished by pivotally mounting the handle I at P to a collar P' upon the steering column E. This permits of depressing the outer end of the lever Q, which will raise the inner end thereof and the contact arm I, while the finger L will be correspondingly depressed to free the same from the path of the dogs. The lever Q may then be actuated either to the right or to the left and will correspondingly actuate the finger L placing the same in a position to be engaged by the steering wheel at the completion of the turning movement and thereby permitting the return of the contact arm to neutral.

It is desirable to provide means for indicating a stop as well as a turning movement of the vehicle. For this purpose I provide a second controlling switch through the operation of which the lights A², A³, A⁴ are displayed, while the lights A and A' remain dark. This controlling switch can be actuated by any suitable part of the control mechanism, preferably a brake pedal as indicated at T which, when depressed, operates the circuit making switch U. This switch is in an electric circuit R, which forms a shunt of the circuit C around the switch D. Thus in operation, whenever the brake pedal P is depressed, the switch U will be operated, closing the circuit R and illuminating the lights A², A³ and A⁴, which indicate the intended stop.

What I claim as my invention is:

1. An electric switch for vehicle signals adapted to be mounted on a steering column of the vehicle adjacent the steering wheel comprising a switch arm movable in opposite directions, a finger projecting from said switch arm, a pair of dogs movable with said steering wheel and arranged on opposite sides of said finger when the steering wheel is in neutral position, a stationary cam arranged adjacent said dogs and adapted to prevent engagement of the latter with said finger upon the initial turning movement of the steering wheel from neutral position.

2. An electric switch for vehicle signals adapted to be mounted on a steering column of the vehicle adjacent the steering wheel comprising a column adapted to be rotatably mounted on said steering column, a switch arm pivotally mounted on said column and provided with an outwardly extending finger, a member adapted to be secured to said steering wheel, a pair of pivotally mounted dogs secured to said member and arranged on opposite sides of said finger when the steering wheel is in neutral position, said dogs being adapted to engage said finger to return the latter to neutral position, a stationary cam arranged adjacent said dogs and adapted to prevent engagement of the latter with said finger upon the initial turning movement of the steering wheel from neutral position, a lever pivotally secured to said steering column and connected to said switch arm for rotating said collar and tilting said switch arm in order to manually adjust the latter without interference by said dogs.

In testimony whereof I affix my signature.

SAMUEL P. JOHNS.